United States Patent [19]
Hehl

[11] Patent Number: 5,360,332
[45] Date of Patent: Nov. 1, 1994

[54] INJECTION MOLDING MACHINE FOR PROCESSING SYNTHETIC MATERIALS

[76] Inventor: Karl Hehl, Arthur-Hehl-Str. 32, D-72290 Lossburg, Germany

[21] Appl. No.: 107,371

[22] Filed: Aug. 17, 1993

[30] Foreign Application Priority Data

Aug. 18, 1992 [DE] Germany .............................. 4227336

[51] Int. Cl.$^5$ ............................................ B29C 45/17
[52] U.S. Cl. .................... 425/150; 425/135; 425/190; 425/192 R; 425/567; 425/574; 425/575; 264/40.1
[58] Field of Search ................... 425/135, 190, 192 R, 425/574, 575, 567, 150, DIG. 224; 264/264, 40.1, 328.11

[56] References Cited

U.S. PATENT DOCUMENTS

| 4,680,002 | 7/1987 | Hohl | 425/574 |
| 4,808,355 | 2/1989 | Kamiyama et al. | 425/190 |
| 4,863,368 | 9/1989 | Hehl | 425/547 |
| 5,007,816 | 4/1991 | Hehl | 425/135 |
| 5,026,265 | 6/1991 | Kanai et al. | 425/574 |
| 5,219,586 | 6/1993 | Yukihiro et al. | 425/574 |

FOREIGN PATENT DOCUMENTS

| 0291008 | 11/1988 | European Pat. Off. . |
| 0368149 | 5/1990 | European Pat. Off. . |
| 0483492 | 5/1992 | European Pat. Off. . |
| 4034577 | 1/1992 | Germany . |

Primary Examiner—Khanh Nguyen
Attorney, Agent, or Firm—Spencer, Frank & Schneider

[57] ABSTRACT

The synthetic material can be injected into the mold carrier, which can be selectively mounted with injecting molds, by an injection molding unit shiftable in horizontal direction transversely with respect to the injection axis. When shifting the injection molding unit the ending sections of the drive unit are received in seats of a seat support movable at the mold carrier. The shifting device engages at the mold carrier and in the region of the seat support. Besides, the injection molding unit is freely displaceable into shifting direction. That is how a shifting of the injection molding unit in a cost-saving and simple way is achieved, meeting all demands arising during the injection process.

13 Claims, 13 Drawing Sheets

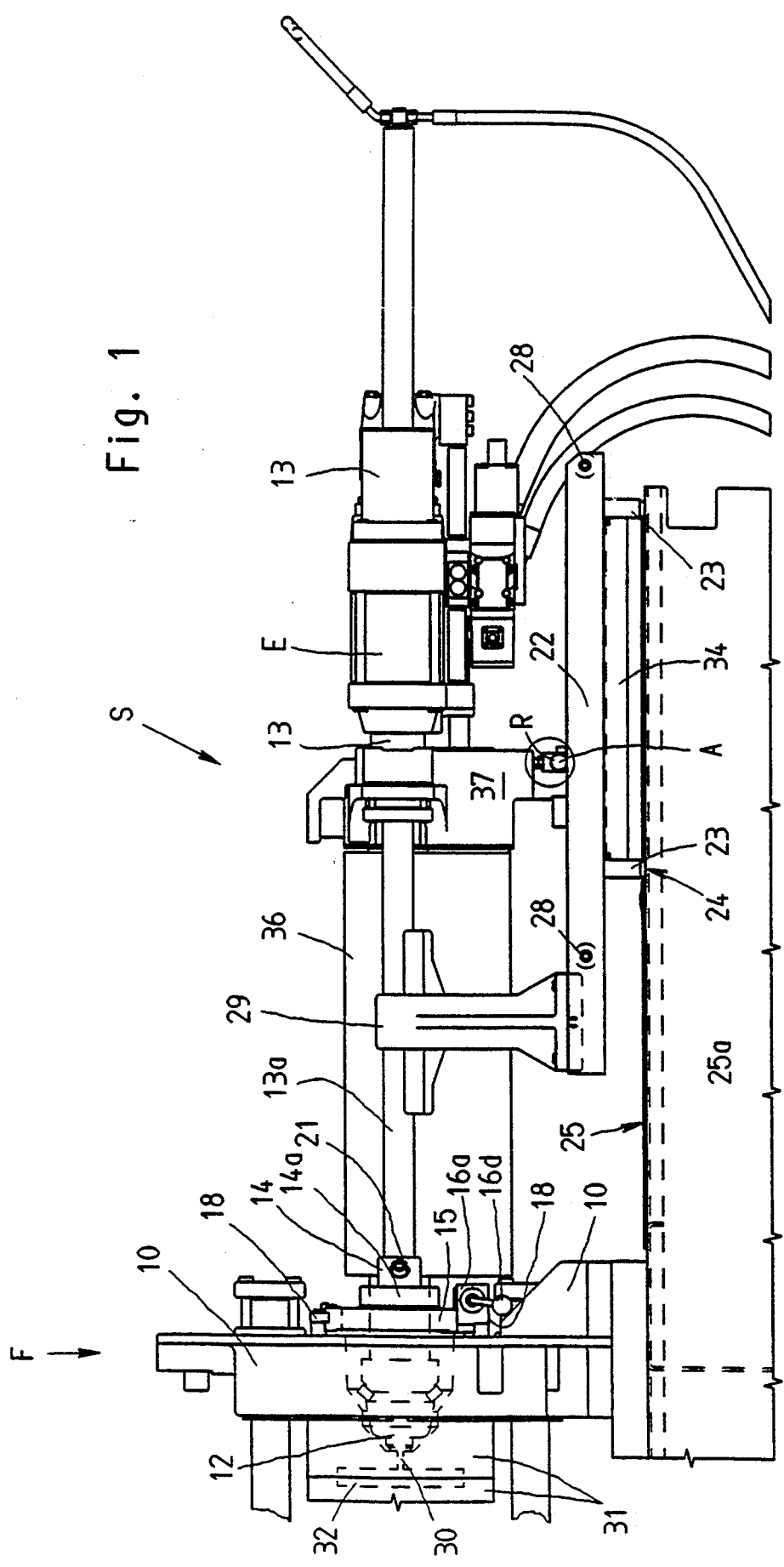

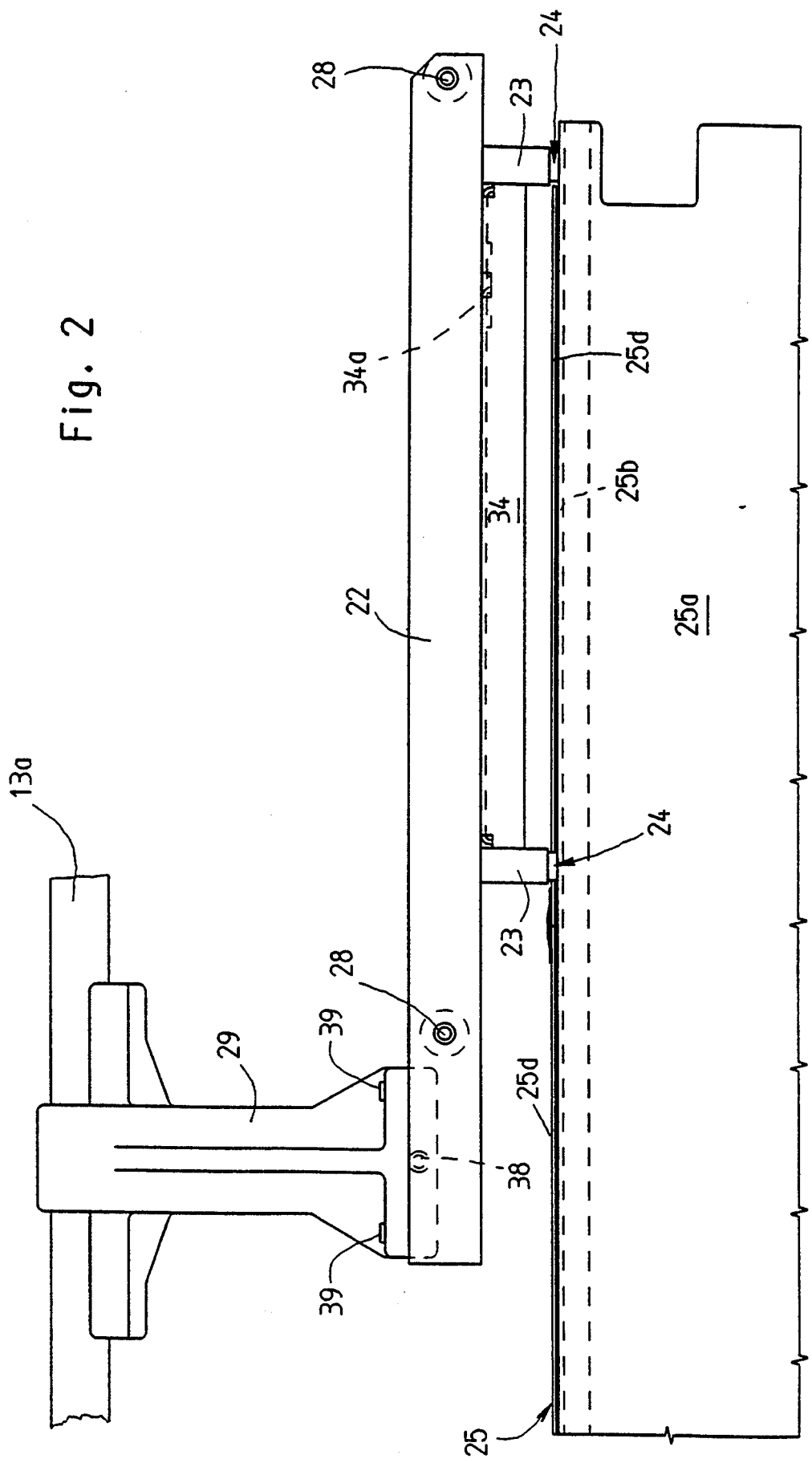

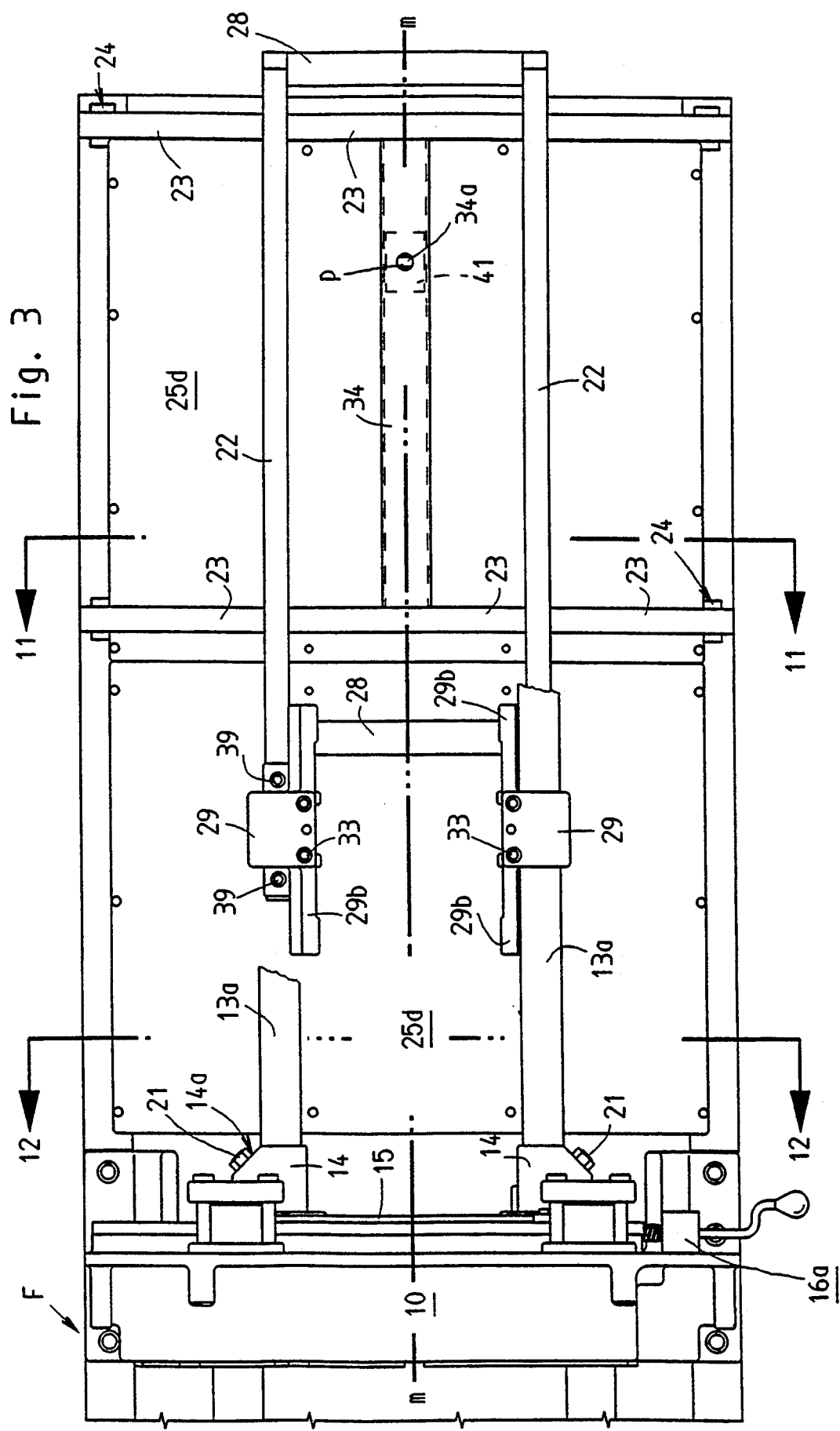

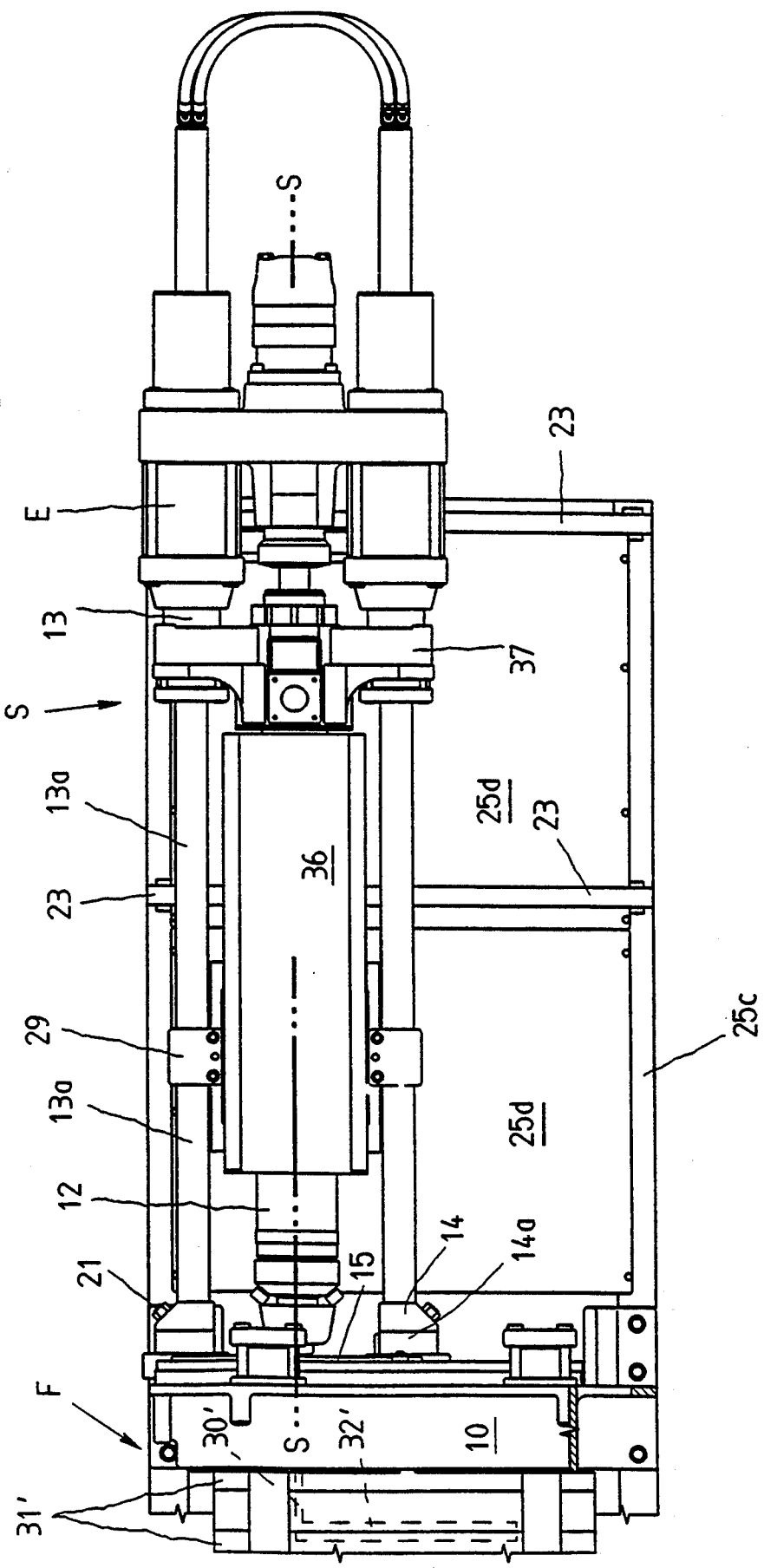

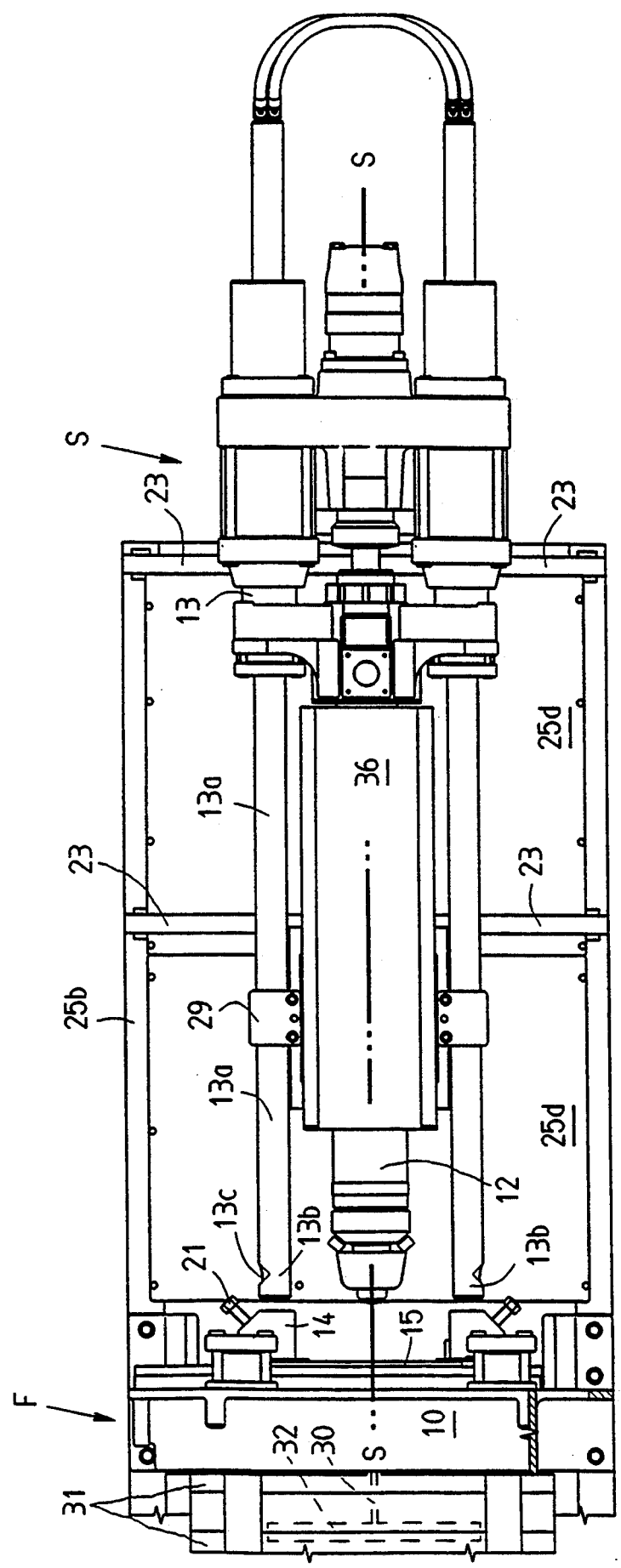

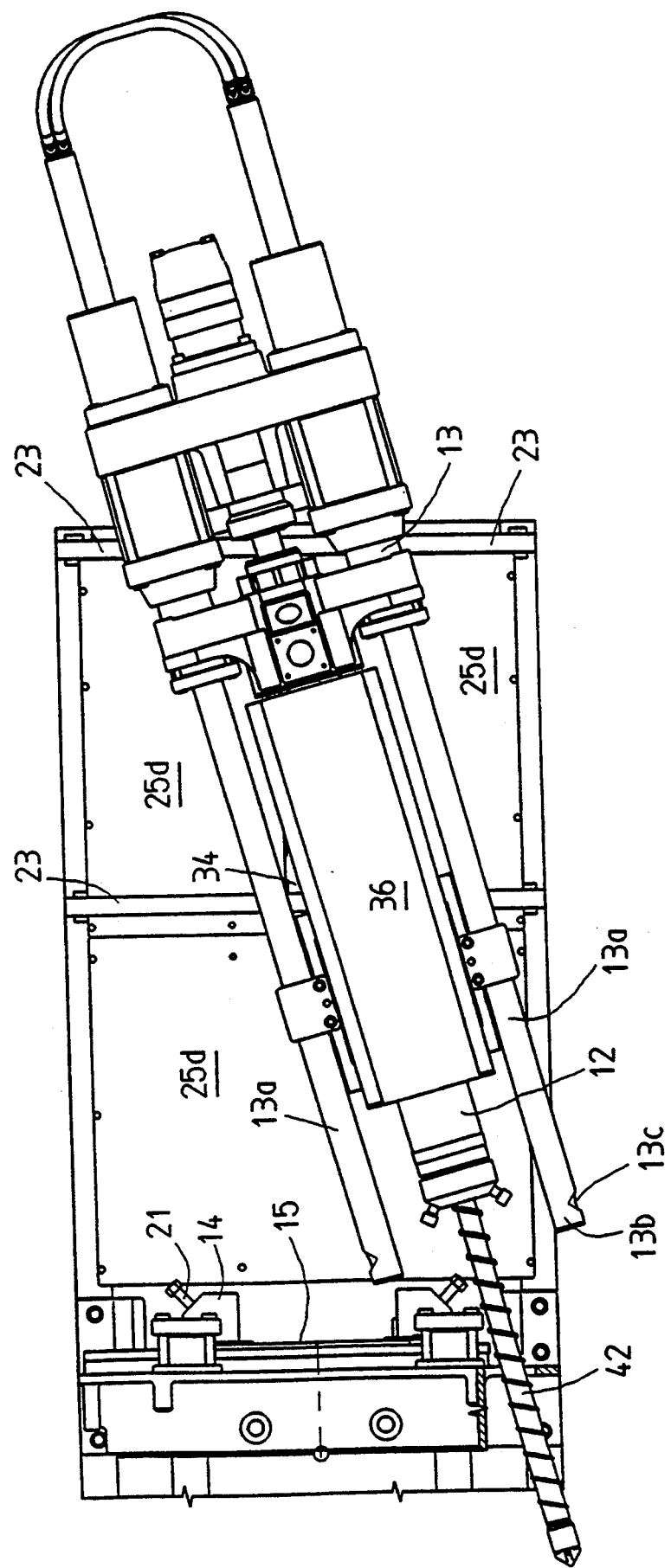

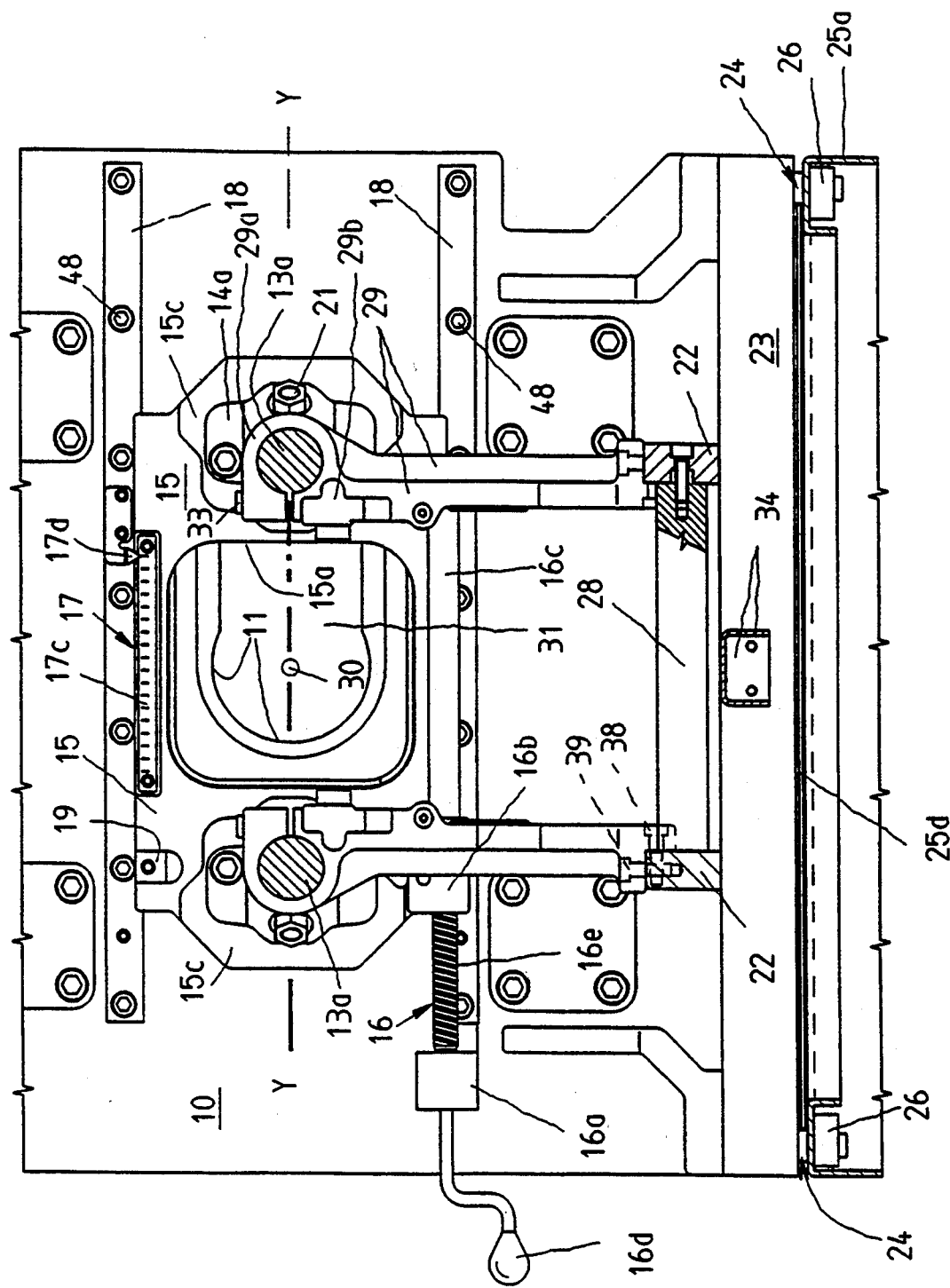

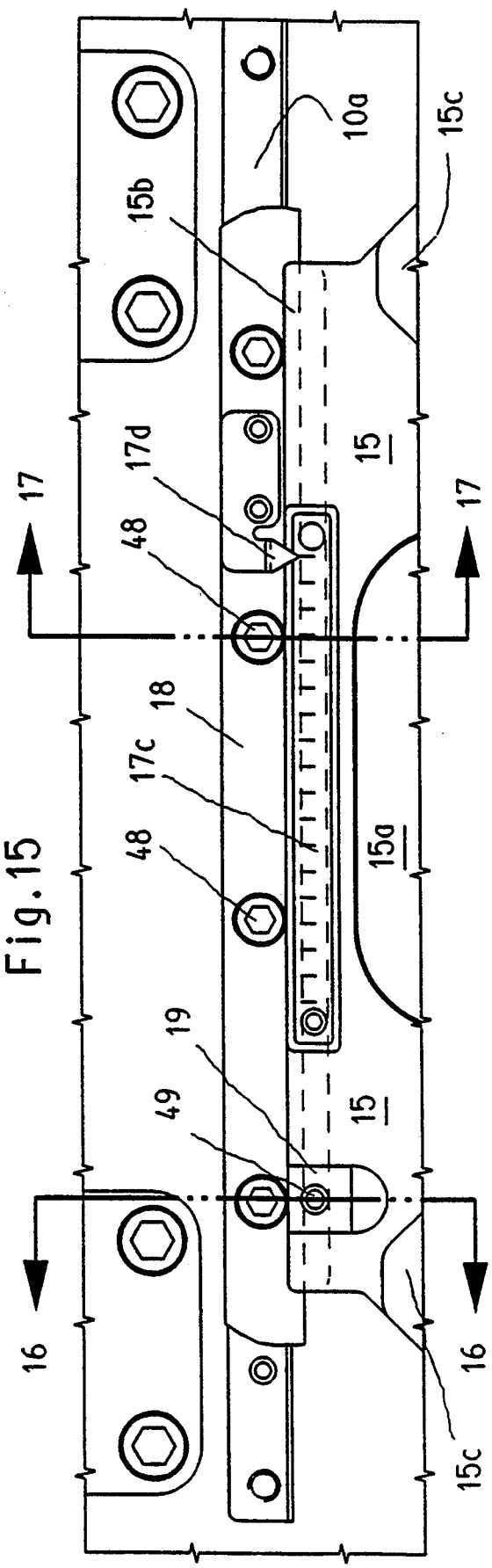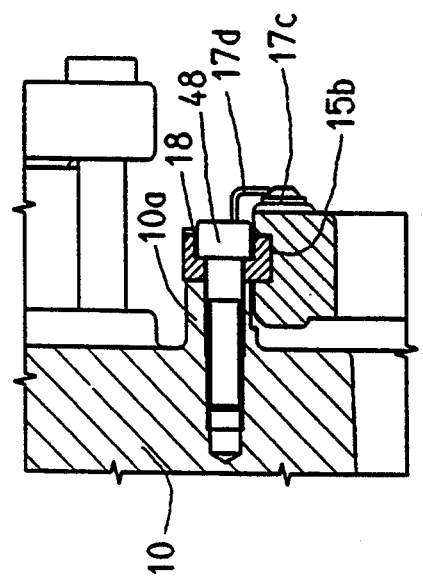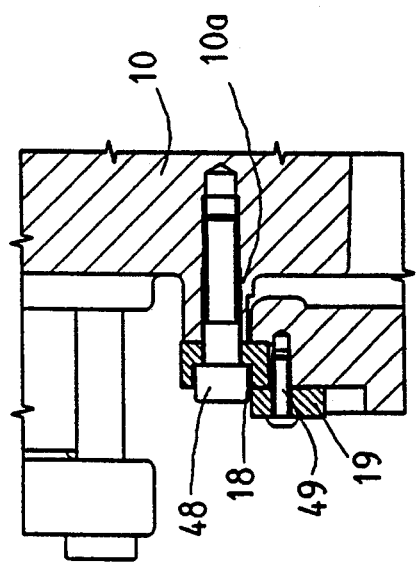

INJECTION MOLDING MACHINE FOR PROCESSING SYNTHETIC MATERIALS

This application claims the priority of German Patent Application P 42 27 336.6, filed Aug. 18, 1992, which is incorporated herein by reference.

BACKGROUND OF THE INVENTION

1. Field of the Invention

This invention relates to an injection molding machine comprising an injecting unit defining a horizontal injection axis and comprising a plasticizing cylinder centered on and movable along the injection axis; the injecting unit is mounted to be movable in a horizontal shifting direction transversely to the injection axis to a plurality of injecting positions and adapted in these injecting positions to selectively discharge plastic material out of the plasticizing cylinder along the injection axis on a plurality of parallel paths into central gatings of first injection molds and off-center gatings of further injection molds, whereby a stationary mold carrier is provided with an enlarged opening in shifting direction for receiving the plasticizing cylinder, which is moved by at least one drive unit along the injection axis into and out of engagement with any of the injection molds, when one of them is mounted on the mold carrier for the injection of synthetic material into mentioned gating. The stationary mold carrier is adapted to selectively carry the first and further injection molds. Guiding elements for ending sections of the drive unit extend up to the stationary mold carrier and are guided in shifting direction when displacing the injection molding unit, whereby free ends of the ending sections are received in seats of at least one seat support displaceable on guiding means; the seat support comprises space for horizontal movement of the plasticizing cylinder onto the gating.

2. Description of the Prior Art

An injection molding machine of this kind is known from German Patent 40 34 577. This machine is adapted to selectively use further injection molds having off-center gatings in different injecting positions defining a central mold cavity. Under these conditions the plasticized synthetic material once injected reaches the mold cavity via a gate running approximately parallel with respect to the closing direction of the mold closing unit. Mentioned gate ends at the border of the mold cavity. A gate system of such a kind in the following is called "parallel gating". In this machine the piston rods lying in a horizontal plane are movably guided in a bushing support, which is passively carried along when the injection molding unit is shifted or also can be displaced manually. When the synthetic material is injected, a force in the piston rods opposed to the bearing pressure of the plasticizing cylinder effects that the bushing support is locked at punctiform guiding elements. Certainly it is a simple way to solve the connection of the bushings receiving the piston rods from the bushing support to the mold carrier, however, a field of force in the mold carrier results from the distance between the straining point of the piston rods and the force introducing points of the guiding elements, which makes necessary a lateral displacement of said guiding elements if shiftings of a large extent are realized. Consequently this facility is not adapted for an automatized shifting over the whole breadth of the mold carrier.

U.S. Pat. No. 5,007,816 discloses a unit of this kind in which the injection molding unit is bedded on a carrier made of cast iron, which bears the injection molding unit and is shiftable on horizontal guidings to central and off-centered gatings. The shifting movement is realized by a shifting device operateable by program, which comprises a distance measuring system as well as a spindle driving. The shifting device is detachably fixed at the carrier. This arrangement allows a precise support and adjustment of the injection molding unit, whereby it is consciously accepted that costly supporting measures, in this case a shifting table, have to be provided. A further problem in this connection is that the feed screw is not easily accessible, especially for cleaning purposes, due to the preset arrangement of the injection molding unit parallely with respect to the injection axis.

SUMMARY OF THE INVENTION

It is an object of the invention so to design an injection molding machine which is of the kind described first hereinbefore, that makes it possible to shift the injection molding unit in an easy way at a reasonable price and is able to deal with all requirements which occur during the injection operation.

That object is accomplished in accordance with the invention in that the shifting device engages in the mold carrier and in vicinity of the seat support and furthermore in that the injection molding unit is freely displaceable in shifting direction.

In such an arrangement the danger of jams is reduced by the lowered distance between shifting device and guiding elements where the shifting actually takes place. The displacement of the injection molding unit is only realized at the mold carrier. In the remaining section the injection molding unit is bedded freely displaceable and slides on the machine base. In spite of the off-center engagement of the shifting device, the occurring forces can be managed securely, so that the high couple of forces are consciously accepted for this kind of engagement. However, it should be considered that the nozzle center is exactly defined for every injection cycle without taking any special measures, since an independant adjustment of the injection molding unit during the locking motion is not impeded due to the fact that the shifting mechanism is placed far away from the cylinder head.

In such an arrangement the seat support is a bushing support and a spindle driving is provided as shifting device for the injection molding unit, whereby a stationary spindle pivot bearing of the spindle driving is provided at the mold carrier and a ball rolling nut of the spindle driving as movable part of the shifting device at the bushing support. Besides, a distance measuring system is associated to the bushing support and to the mold carrier, whereby a movable part of the distance measuring system is disposed at the bushing support in vicinity of the guiding elements and a stationary part of the distance measuring system is disposed at the guiding elements of the stationary mold carrier, thus allowing that the bushing support together with the injection unit is shiftable by means of a spindle, which can be retrofitted in case necessary. Besides, there is the possibility to realize a motor-driven shifting of the injection molding unit, according to the respective requirements of the customer. In so far it is necessary either to provide a distance measuring system, which gives the operator visually the possibility of adjustment or to provide an electronical distance measuring system, which in case of an automatized installation controls the motor that effects the shifting over the determined shifting distance.

According to a preferred feature the guiding elements are guide rods and the end sections are constituted by piston rods of hydraulic drive cylinders of the drive unit and are arranged in a horizontal plane of symmetry of the mold carrier and are guided over almost the whole breadth of the mold carrier, at least in vicinity of the seats, by the guide rods fixed at the mold carrier. The seat support comprises a guiding groove on its top and its bottom, whereby the guide rod submerges into the guiding groove and the seat support movable with clearance is fixable at the guide rod by clamping elements and is arrestable in any of the injecting positions by clamping to the guide rods on that side of the guide rod that is turned away from the clamping elements. In such an arrangement the force introduction into the mold carrier is further improved on the one hand by the guide rod which guarantees that the force is transmitted regularly to the mold carrier and on the other hand by the guiding groove in which the guide rod runs, which secures a safe guiding. Since the force introduction is effected to a guiding element extending over almost the whole breadth, which force in the piston rods is opposed to the contact pressure of the plasticizing cylinder, a force identical connection in every position is granted. Consequently it is not necessary anymore to connect the injection molding unit at different points to the mold carrier. Instead the injection molding unit can be moved into any position desired. The customer has the possibility to fix the moved injection molding unit in its position provisionally by means of a clamping element. A back handle created by the embodiment of the guiding groove effects that due to the contact pressure the clamping element is not subject to the high tensile forces arising during the injection process. The locking in this position is realized by pressing the wall of the groove facing the mold against the wall of the guide rod facing the mold.

According to a preferred feature a first pair of bushing elements having a first spacing and being mounted on flat grinded clamping surfaces of the bushing support and being adapted to be replaced by a further pair of bushing elements adapted to be mounted on the bushing support and having a second spacing differing from the first spacing is provided. The bushes of the further pair differ in inside diameter from bushes of the first pair. In such an arrangement it is possible to couple injection molding units in which ever way the might be formed and indifferent in which position the ending sections of the drive unit are arranged.

According to a preferred feature when shifting first rods disposed into injection direction and bearing the injection molding unit slide on second rods transversely disposed with respect to the injection axis, which are supported on finish-machined bearings at a machine base. The second rods are cross bars, the bearings are formed at a flanged longitudinal edge of side walls of the machine base, a buttress block placed under the longitudinal edge is welded on from above by slots and abuts a screw centered at the buttress block for the cross bars, the mentioned screw being formed as an adjusting screw. In such an arrangement the injection molding unit is supported only by rods sliding on top of each other. In so far no costly shifting mechanisms are necessary and the shifting facility is loaded with the frictional forces of the support being applied off-center. The surface friction drag can be reduced by plasma-nitriding the friction surfaces, whereby at the same time the requirements for a reliable protection against rust are met. On account of the flat materials used a supporting accurate to dimensioning is made possible in an easy way, without the necessity of forming the machine base rigidly. The only expenditure that comes up is at the support points of the machine base, in order to guarantee a connection of the rods to the machine base in an adjustable manner. Even if the machine base is not adjusted accurately on the spot, a precise regulation to dimensioning of the whole injection molding unit is possible by means of the adjusting device. However, basically a fixed connection of the cross bars with the machine base is sufficient, so that the cross bars are adjusted themselves together with the machine base when this is regulated. The slots make possible a simple manufacturing, since the buttresses necessary for realization of the adjustment can be fixed easily in the machine base from above. Although thus the injection molding unit glides on untreated surfaces of the machine when shifted, less friction is caused during this shifting process.

According to a preferred feature first rods are a pair of rods constituting a slide together with two cross webs, whereby the slide bears supporting members on its front side for the drive unit. In such an arrangement the slide glides on rods, which are only supported at the lateral edges of the machine base, so that the space inside the machine base is always accessible for maintenance purposes. The coverings of the machine base placed under the rods can be removed independant whether the injection molding unit is mounted or not. In case the injection molding unit is mounted it can be shifted to the left respectively to the right side, thus permitting free access for the maintenance staff.

According to a preferred feature the supporting members are constituted by two identical casting bodies, disposed mirror symmetrically with respect to a vertical plane extending through the injection axis and mentioned supporting members being formed as radially splitted tensioning bushings in the area of the end sections of the drive unit, the tensioning bushes being clampable with the end sections by means of pulling bolts which intersperce gaps of the splitted tensioning bushings. Since in such an arrangement the supporting members, which link the drive unit with the slide, are constituted by two identical casting bodies being interconnected by cross bars, it is easier to manufacture these casting bodies, since no costly casting molds are required. Besides, each of the supporting members can be easily exchanged in case of disturbances. An additional advantage results from the shaping of the supporting members, which makes it possible to reduce the risk of blowhole formation in comparision to the known U-shaped shackles used so far.

According to a preferred feature the second rods are formed as cross bars and are interconnected by means of a supporting rod provided with a rest opening in which said injection molding unit is lockable. The support rod disposed in a plane of symmetry of the injection molding unit receives a rest element in mentioned rest opening of the injection molding unit when returned and wherein the injection molding unit is horizontally pivotable, whereby the piston rods of the drive cylinders, which are detached from the bushings after resting has been effected, are withdrawable. In such an arrangement the support in the rear section represents an improvement for maintenance works for example of the feed screw or the plasticizing cylinder. Before the piston rods are detached from the bushing support and after the injection molding unit is returned, it can be supported and secured at the machine base. The point at which the supporting is effected serves as swivelling point for slewing motions, which guarantee an easy access to the feed screw. In order to avoid that the remaining parts of the injection molding unit overturn, especially in case the feed screw and/or the plasticizing cylinder are dismantled, the injection molding unit is secured in this position by means of a lever. These and other objects and aspects of the invention are better understood with reference to the detailed description and accompanying drawings, and it will be understood that changes in the specific structure shown and described may be made within the scope of claims without departing from the spirit of the invention.

BRIEF DESCRIPTION OF THE DRAWING

FIG. 1 is a side view of a part of the injection molding machine, which is limited to the mold carrier of the mold closing unit and the injection molding unit.

FIG. 2 shows an enlarged cutting of FIG. 1, which represents the bearing construction.

FIG. 3 is a top view of the injection molding machine according to FIG. 1, however, for a better clearness of the representation the injection molding unit, except the piston rods has been removed.

FIG. 4 is a top view of the injection molding machine according to FIG. 1 showing the injection molding unit in a lateraly shifted position.

FIG. 5 is a representation according to FIG. 4, whereby the injection molding unit is shifted into its central position, the piston rods being already returned.

FIG. 6 is a representation according to FIG. 5, whereby the injection molding unit has been swivelled for maintenance purposes.

FIGS. 11, 12 are views of the mold carrier cutted in accordance with lines 11—11 resp. 12—12 of FIG. 3.

FIG. 15 is an enlarged cutting of FIG. 12 in the region of the scaling.

FIGS. 16, 17 are cuttings according to lines 16—16 resp. 17—17 of FIG. 15.

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not necessarily be construed as limiting the inventive concept to any particular physical configuration.

Figure 12:
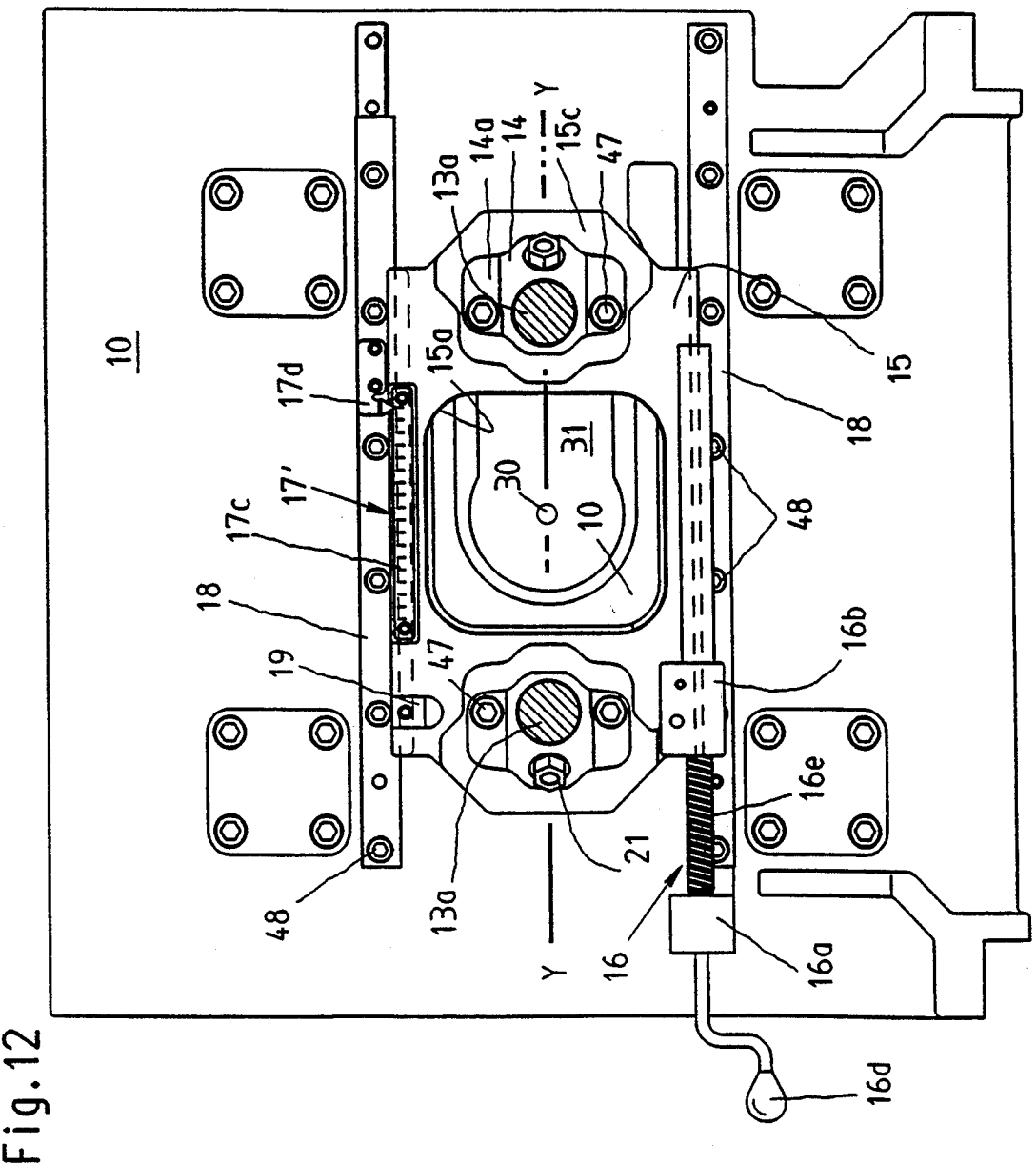
Figure 14:
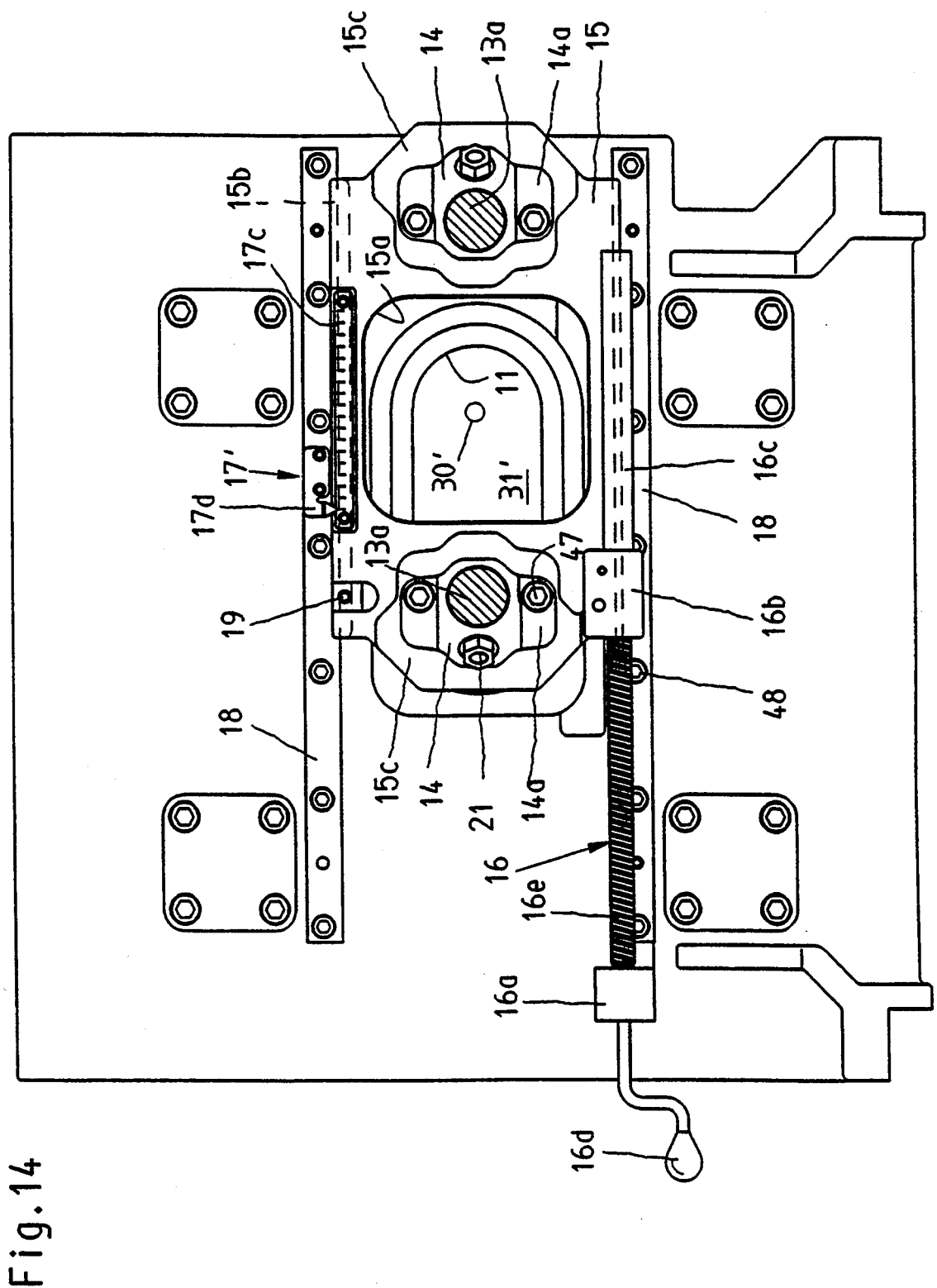
FIG. 14 is a representation according to FIG. 12 in a off-center gating shifted position.

The stationary mold carrier 10 is part of the horizontally closing mold closing unit F of an injection molding machine for processing synthetic material, which is provided with a horizontally injecting injection molding unit S. The mold carrier 10 is adapted to carry first injection molds (FIG. 12) having a central gating 30 defining a central mold cavity 32. Besides, different further injection molds 31' (FIG. 14) having an off-center gating 30' defining a central mold cavity 32' can be selectively carried by the mold carrier 10. An injection molding unit S, mounted to be movable in horizontal direction transversely with respect to its injection axis s—s by means of a shifting device, injects the plasticized synthetic material or any comparable material, as for example ceramic material, suitable for the production of machine injected mold parts. Thereby the injection is effected in a parallel gating manner after the injection molding has been parallely displaced.

The mold carrier 10 has an enlarged opening 11 in shifting direction for receiving the plasticizing cylinder 12, which is disposed substantially symmetrical with respect to its horizontal plane of symmetry y—y (FIG. 11). The plasticizing cylinder can be put against the respectively mounted injection molds 31, 31' by means of hydraulic drive cylinders. However, it is also possible to use other kinds of drivings as for example electromechanical or pneumatical ones. The piston rods 13a of the drive cylinders 13 extend up to the mold carier 10 and constitute ending sections of the drive unit. When the injection molding unit S is displaced the free ends 13b are received in seats of at least one seat support shiftable on the guiding elements. Bushings 14 are used as seats. The seat carrier in the following is designated as bushing support 15. The bushing support 15 is provided with a recess 15a between its seats, which are formed as bushings for penetration of the plasticizing cylinder. The piston rods are indirectly guided by guiding elements of the mold carrier 10 via the bushing support 15. These guiding elements are placed outside the opening 11, for example above and below the opening. Thus the bushing support transmits the forces transmitted by the piston rods 13a during the injection process via the guiding elements to the mold carrier 10. As is apparent from FIGS. 12 and 14, the bushing support 15 overlaps approximately half of the opening 11, when it is in its two opposed extreme shifting positions. During the injection process the piston rods are axially fixed in their position at the bushing support 15.

Figure 19:
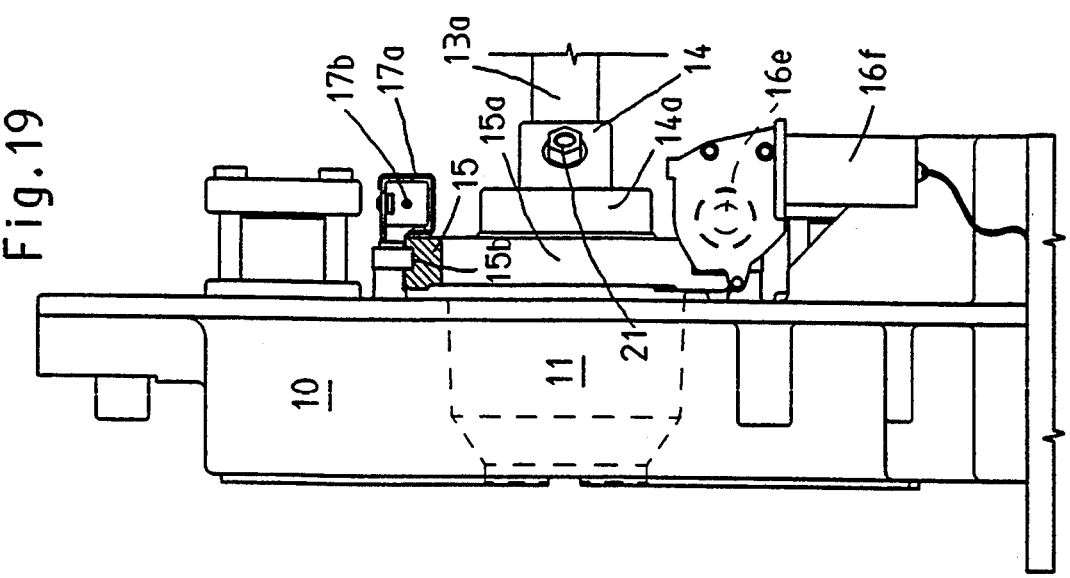
FIGS. 18, 19 is a representation of the mold carrier corresponding to FIGS. 12 resp. 13 comprising a motor-driven shifting device.
Figure 18:
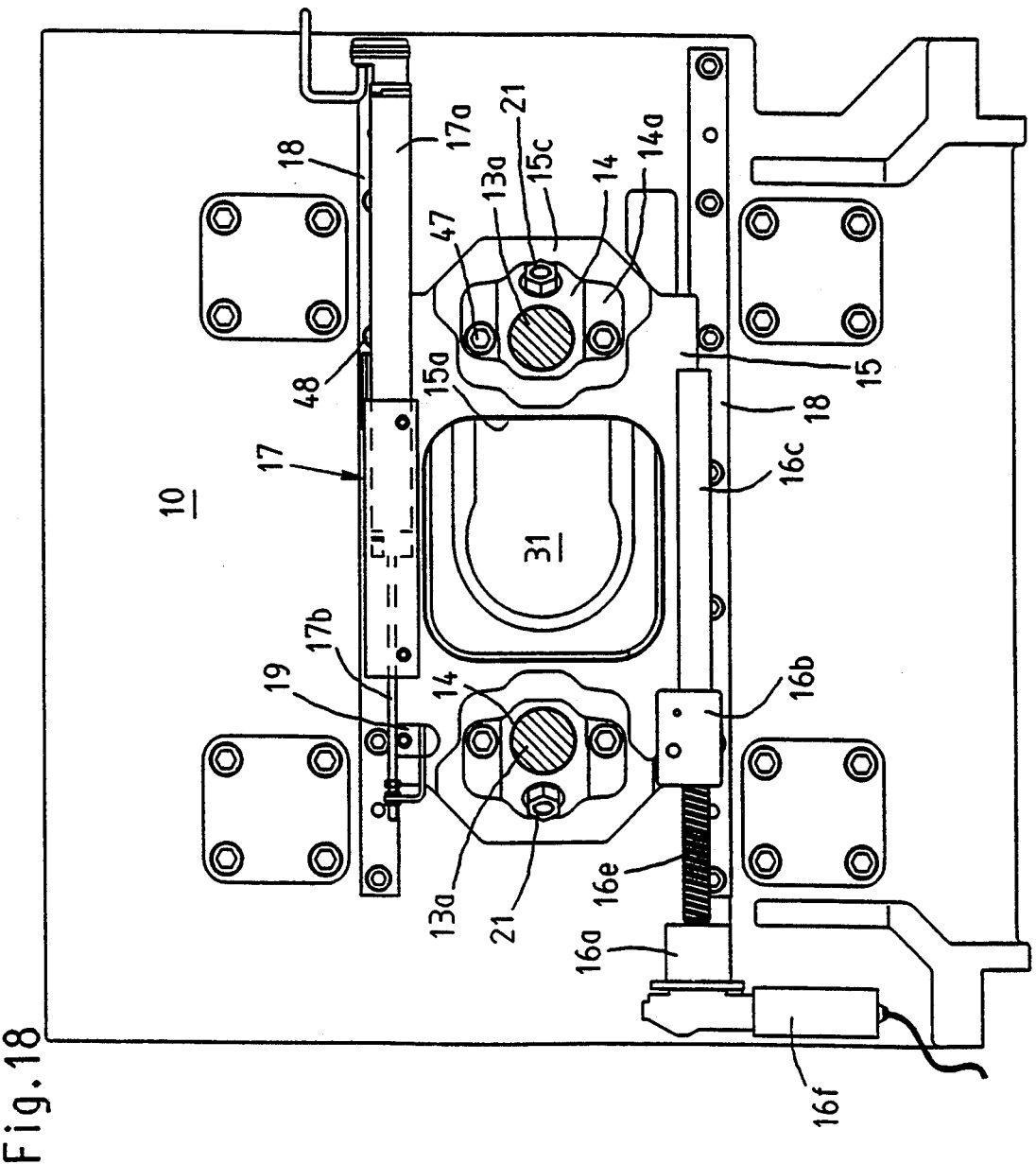

The displacement of the bushing support 15 is effected by means of a shifting device, which in this concrete execution example is formed as spindle driving, the stationary part being arranged at the mold carrier and the movable part at the bushing support 15 which is formed as a seat support. It is possible to arrange the shifting device in different ways in this region, which comprises the mold carrier, the bushing support or the ending sections of the drive unit. Otherwise the injection molding unit is supported on the machine base and freely displaceable at least into the shifting direction. The spindle driving can be actuated manually by means of a crank 16d as in the execution example shown in FIGS. 11–14 or by an electrically or hydraulically driven motor 16f for example, as is apparent from the execution shown in the FIGS. 18 and 19. The spindle pivot bearing 16a is arranged at the mold carrier, whereas the nut 16b is associated to the bushing support. In order to prevent difficulties as for example dirt accumulations in the threaded spindle 16c, it is protected by a spindle sleeve in the region between the two piston rods 13a.

Distance measuring devices are associated to the bushing support 15 and the mold carrier 10. The movable part of the distance measuring device is arranged at the bushing support 15 in vicinity of the guiding elements and its stationary part at the mold carrier 10 at the guiding elements. The machine can initially be delivered in a variant already prepared for later being supplemented with the shifting device. According to the corresponding requirements of the customer the machine can be either retrofitted or be supplied right from the beginning with the motor actuated spindle driving. In case a motive displacement is effected a linear potentiometer is provided as distance measuring device 17, which housing 17a is mounted at the mold carrier 10 and which sliding contact support 17b is connected with the bushing support. Thereby the distance measuring system 17 emits signals to a control equipment indicating how far the injection molding unit has been already displaced, so that a precise adjustment of the injection molding machine can be effected by a variance comparison. In case the injection molding unit is shifted manually a scaling 17c disposed at the bushing support and a pointer 17d placed at the guide rod 18 which is formed as guiding element is sufficient as distance measuring system 17'.

In order to realize a shifting over the whole range desired, the guide rod 18 extends over almost the whole breadth of the mold carrier. The guide rod 18 is directly connected with a forming 10a of the mold carrier 10 by means of studs. The piston rods 13a lying in a horizontal plane of symmetry y—y of the mold carrier 10 are guided by the guide rods 18 over almost the whole breadth of the mold carrier, but at least in the region of the bushings 14. Due to the plurality of studs 48 which secure the guide rods 18, the force introduction is almost identical in every position of the injection molding unit.

The bushing support is provided with a guiding groove 15b on its top and its bottom into which the guide rod 18 submerges. The movable bushing support 15, which is shiftable with clearance, can be fixed at the guide rod 18 by at least one clamping element (FIG. 11). When injecting the material into the mold cavity 32 the arising contact pressure of the plasticizing cylinder 12 leads to an opposed tensile force in the piston rods, which is transmitted extensively from the groove wall 15b (FIG. 17) of the bushing support 15 facing the mold to the wall of the guide rod 18 facing the mold. When distorting by means of a clamping element 19 the bushing support 15 is already drawn by the pulling bolt 49 into direction of the tensile force. However, this tension force is not as strong as the tensile force arising during the injection process. Since the pulling bolt is arranged on that side turned away from the mold carrier, it is not fully subjected to the tensile force. Instead the tension force in the pulling bolt 49 is reduced during the injection process.

At the bushing support 15 itself the piston rods 13a formed as ending sections of the drive unit are held in the bushings by pulling bolts 21, which engage at the clamping surfaces 13c of the piston rods. The bushings are either directly formed at the bushing suport 15 or are fixed at the bushing support by bushing elements 14a. The bushing elements 14a are thereby connected with the bushing support 15 by means of pulling bolts 47. Alternatively it is possible to mount different pairs of bushing elements with formed bushings on the flat grinded clamping surfaces 15c of the bushing support 15. The individual bushing elements 14a differ from each other by a different interdependant distance and/or a different inside diameter of their bushings. As known from prior art it is also possible to provide two bushing supports, each of them respectively receiving only one piston rod.

The free displaceability of the injection molding unit in the region turned away from the mold carrier is effected due to the fact that the injection molding unit when shifted slides on rods transversely disposed with respect to the injection axis by means of a pair of rods 22 which bears the injection molding unit and is disposed in injecting direction. Due to the cruciform arrangement of these rods, as is especially apparent from the top view according to FIG. 3, in the following they are designated as cross bars. Both cross bars 23 are supported on four finish-machined bearings at the machine base 25 and otherwise bridge the whole machine base (FIG. 11). The design of such a bearing section is represented in the FIGS. 9 and 10. Basically the bearing 24 for the cross bars according to the FIGS. 10 and 11 is located at the flanged longitudinal edge 25b of the side walls 25a of the machine base 25. Each bearing is provided with two slots 25c at mentioned longitudinal edge, which make it possible to weld a buttress block 26 on the machine base from above. This buttress block 26 serves as buttress for a centered screw 27. An opening is provided between the two slots 25c, which coaxially receives the screw 27 and a centering piece serving as bearing 24. The centering piece is bedded at the buttress block 26 as well as at the cross bars 23 in respective recesses 23a, 26a. Since the cross bars 23 can also be adjusted at this bearing points, in order to be independant from a precise mounting and the rigidity of the machine base, the screw 27 basically can also be an adjusting screw. In this case the screw 27 is accessible from below, however, it is also possible to provide the machine base with openings for putting ones hand through if required, so that it is easier to get to the screw. As an alternative the manufacturer is able to supply an execution in which the cross bars 23 are connected with the machine base in such a manner, that they are adjusted on the spot simultaneously with the machine base.

As can be seen from the representations according to FIGS. 2 and 3, the whole injection molding unit is beared by a pair of rods 22, which is connected so to constitute a slide by two cross bars 28. On its front side this slide bears supporting members 29 for the drive cylinders 13. As is apparent from FIG. 11 the supporting members are connected with the pair of rods 22 via connecting pins 38, 39. The supporting members are identical pieces, each of them being associated to each one piston rod 13a of the drive cylinders. In FIG. 4 both supporting members are arranged mirror symmetrically with respect to vertical plane running across the injection axis s—s. The pieces are casting bodies which are formed as radially cracked tensioning bushes 29a (FIG. 11) in the region of the piston rods 13a and are connected with a spanner 29b by means of pulling bolts 33 interspercing the joint for clamping of the piston rods 13a.

Figure 8:
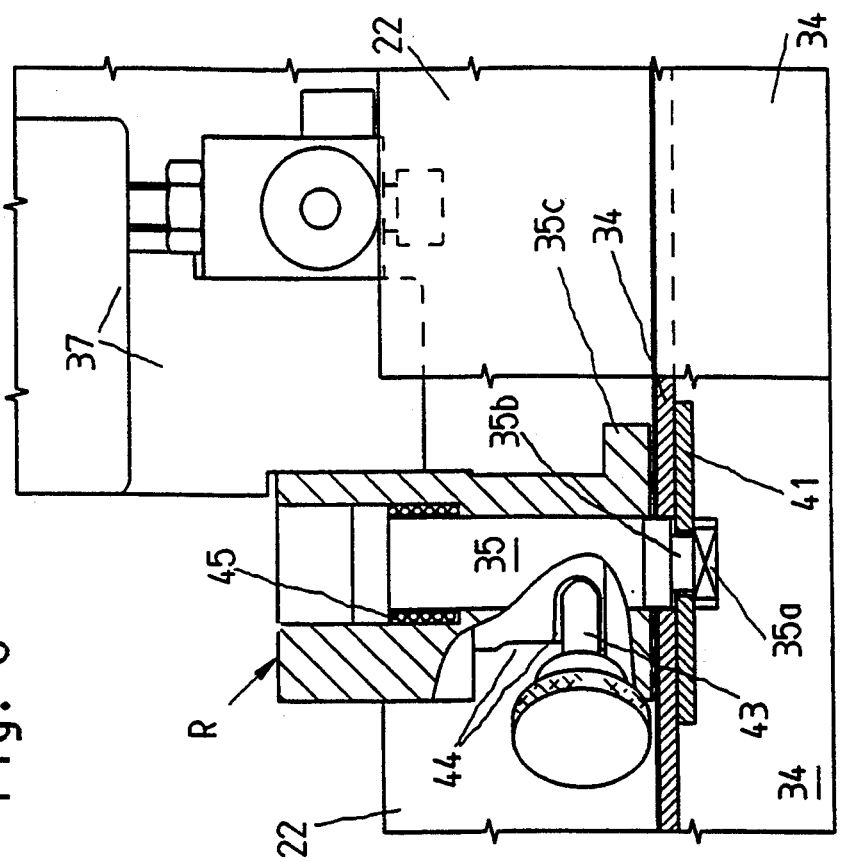
FIGS. 7, 8 show an enlarged cutting of section A of FIG. 1 in an unlocked respectively locked position of the stopping element for the swivelling process.
Figure 7:
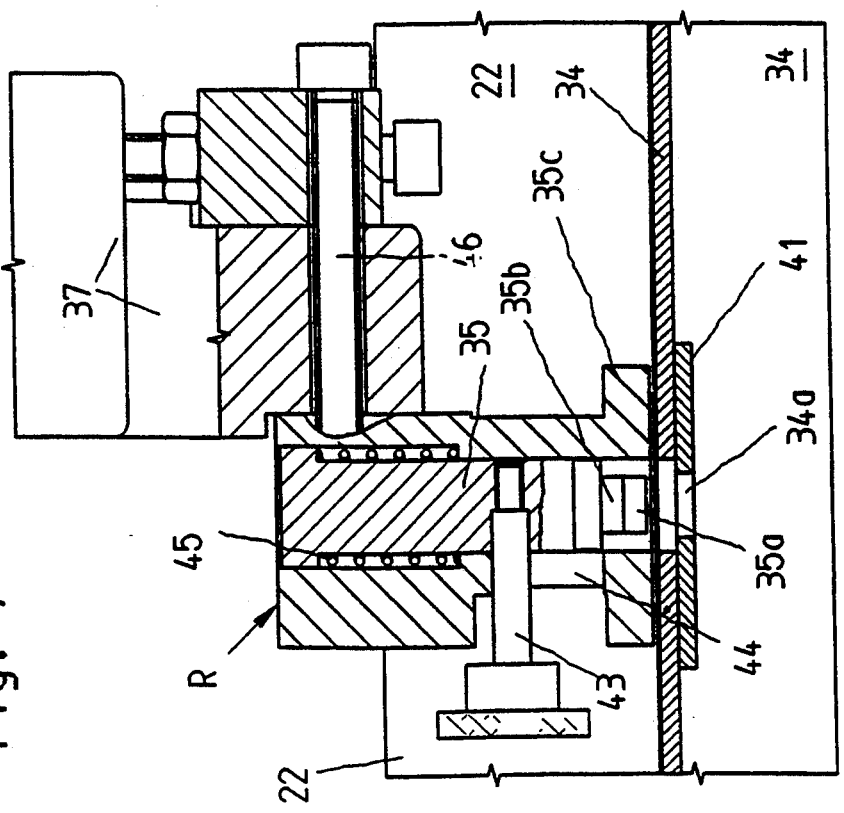

The cross bars 23 are interconnected by a supporting rod 34 being provided with a rest opening 34a in which the injection molding unit S can be locked by means of a stop mechanism R. This stop mechanism R is represented as an enlarged partial section A of FIG. 1 in the FIGS. 7 and 8. A counter plate 41, having a rectangular opening into which a rest element submerges, is arranged in the region of the rest opening. The rest element 35 is provided with a rectangular element 35a and a back handle 35b. The rest element 35 is adapted to be first vertically moved and then horizontally turned in a slot 44 against the force of a spring 45 by means of a lever 43. In the unlocked position according to FIG. 7 the lever 43 extends transversely as to the injection axis. When the lever 43 is moved vertically the cross-sectional form of the rectangular element 35a coincides with the rest opening 34a with regard to its cross-sectional form. During the turning movement taking place subsequently, its final state shown in FIG. 8, the rectangular element 35a is turned and placed under the counterplate 41. This movement leads to a locking to the back handle 35b with the counterplate 41. The rest element 35 submerges into the rest opening above the back handle 35b until it is almost close to the counterplate 41. The stop mechanism R is supported by the bearing section 35c on the supporting rod 34. According to FIG. 7 the whole stop mechanism can be later fixed at the bearing body by bolts and be retrofitted by customer's request.

For locking the injection molding unit is returned to the "indexing" until the rectangular element 35a and the rest opening 34a overlap. After locking the piston rods 13a are loosened at the pulling bolts 21 from the bushing support. The piston rods are returned by the action which usually effects an advancing (FIG. 5). In the indexed position the injection molding unit can be safely swivelled on the cross bars 23 as represented in FIG. 6, in order to pull out the feed screw 42 from the plasticizing cylinder for cleaning purposes for example. When swivelled the center of gravity being in the region of the bearing body 37 lies approximately over the swivelling point P preset by the stop mechanism R. However, due to the arrangement of the supporting rod 34, the rest opening 34a on its part lies also approximately in the center of the plane of symmetry m—m of the injection molding machine.

Figure 9:
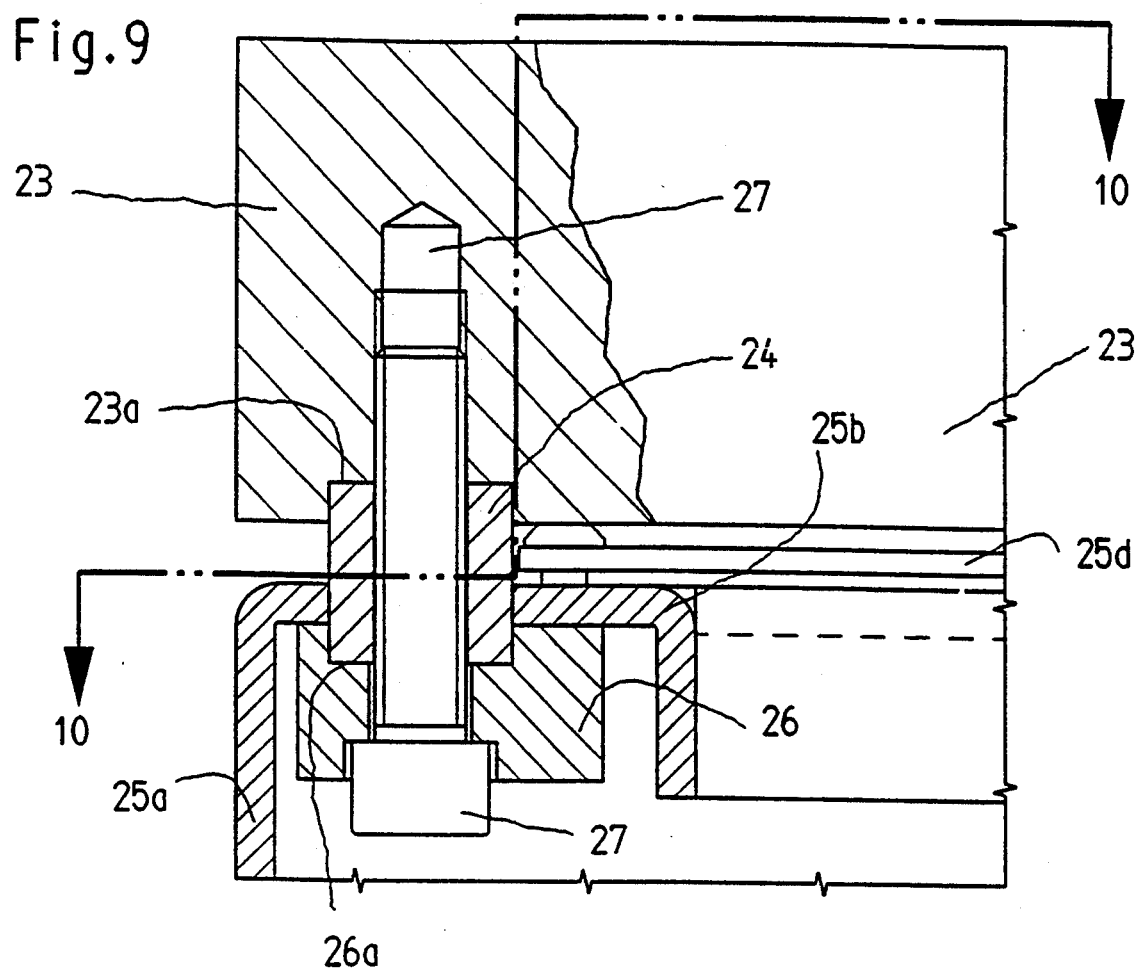
FIG. 9 is a side view in the region of a bearing point of the cross bars.
Figure 10:
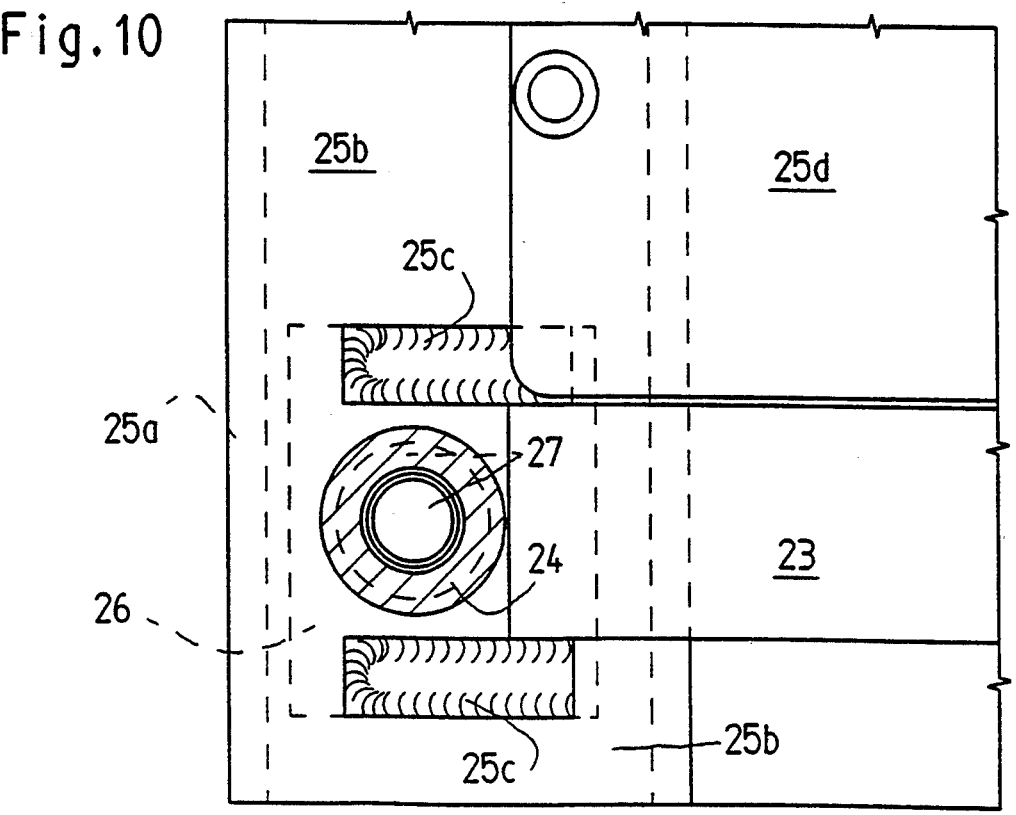
FIG. 10 is a top view of the bearing according to FIG. 9, partially cutted in accordance with line 10—10 of FIG. 9.
Figure 13:
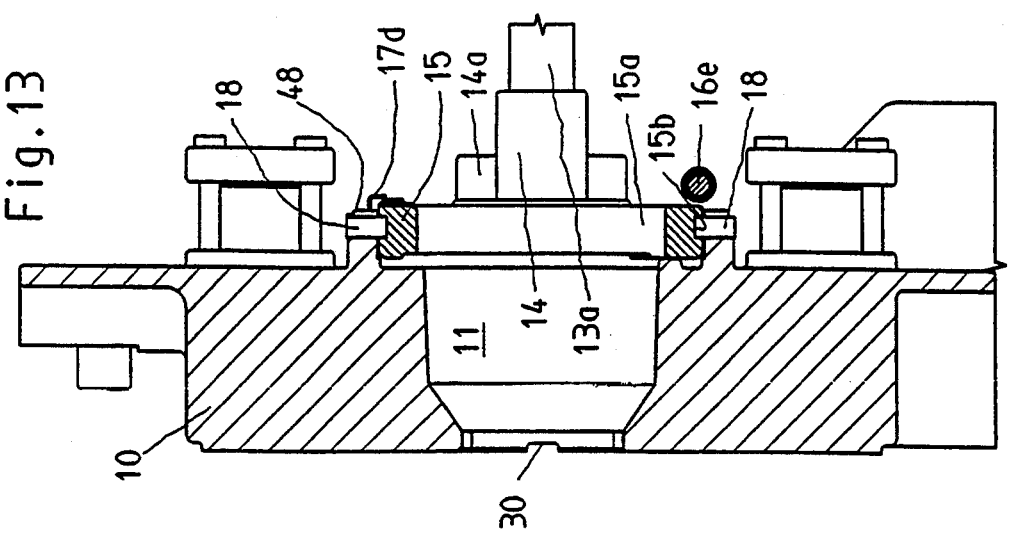
FIG. 13 is a cutting of the representation according to FIG. 12 in the region of a vertical plane running through the injection axis.

In spite of everything the inner chambers of the machine base 25 are accessible at any time by the covering plates 25d, as is apparent from the FIGS. 2, 9 and 11, since the covering plates 25d can be pulled out under the cross bars if required. Depending on which side of the injection molding machine the maintenance in the interior of the machine base has to be realized, the injection molding unit can be shifted accordingly, thus permitting free access without being impeded by the injection molding unit S. Finally FIG. 1 reveals the general design of the injection molding unit. The plasticizing cylinder is surrounded by a protective housing 36 and the injection cylinders E are placed coaxially to the drive cylinders 13. Just this construction of the injection aggregate makes it possible that high forces are brought up namely in connection with the correspondingly dimensioned bushing support, as they are more and more required today and in the future due to the constantly growing demands on the properties of the materials used.

It will be understood that the above description of the present invention is susceptible to various modifications, changes and adaptations, and the same are intended to be comprehended within the meaning and range of equivalents of the appended claims.

It is claimed:

1. An injection molding machine comprising
   (a) an injecting unit defining a horizontal injection axis and having a plasticizing cylinder centered on and movable along said injection axis,
   (b) a shifting device coupled to said injecting unit for moving said injecting unit in a horizontal shifting direction transversely to said injection axis to a plurality of injecting position to selectively discharge, in said injecting positions, plastic material from said plasticizing cylinder along said injection axis on a plurality of parallel paths,
   (c) first injection molds having central gatings and further injection molds having off-center gatings for receiving said plastic material from said plasticizing cylinder,
   (d) a stationary mold carrier facing said injecting unit and being provided with an enlarged opening in said horizontal shifting direction for receiving said plasticizing cylinder in each of said injecting positions; said stationary mold carrier being adapted to selectively carry said first and said further injection molds,
   (e) at least one drive unit having ending sections extending to said stationary mold carrier; said drive unit being operable to move said plasticizing cylinder along said injection axis into and out of engagement with a selected said injection mold mounted on said mold carrier for the injection of said synthetic material into the gating of said selected injection mold,
   (f) guiding elements mounted on said stationary mold carrier for guiding said ending sections of said drive unit in said shifting direction when displacing the injecting unit by said shifting device, and
   (g) at least one seat support mounted on said guiding elements for displacement therealong; said at least one seat support having seats for receiving free ends of said ending sections; said at least one support including a space for allowing a horizontal movement of said plasticizing cylinder onto said gating of said selected injection mold; said shifting device engaging in said mold carrier adjacent said seat support; and said injecting unit being freely displaceable in said shifting direction.

2. The injection molding machine as set forth in claim 1, wherein said seat support is a bushing support; and further wherein said shifting device comprises a spindle drive including a stationary spindle pivot bearing mounted on said mold carrier; said spindle drive further including a ball rolling nut constituting a travelling part of said spindle drive and being attached to said injecting unit at said bushing support.

3. The injection molding machine set forth in claim 2, whereby
   a distance measuring system is associated to said bushing support and to said mold carrier, whereby a movable part of said distance measuring system is disposed at said bushing support in vicinity of said guiding elements and a stationary part of said distance measuring system is disposed at said guiding elements of said stationary mold carrier.

4. The injection molding machine set forth in claim 1, whereby
   said guiding elements are guide rods and said end sections are constituted by piston rods of hydraulic drive cylinders of said drive unit and are arranged in a horizontal plane of symmetry of said mold carrier and are guided over almost the whole breadth of said mold carrier, at least in vicinity of said seats, by said guide rods fixed at said mold carrier.

5. The injection molding machine set forth in claim 4, wherein
said seat support comprises a guiding groove on its top and its bottom, said guide rod submerges into said guiding groove and said seat support movable with clearance is fixable at said guide rod by clamping elements and is arrestable in any of said injecting positions by clamping to said guide rods on that side of said guide rod that is turned away from said clamping elements.

6. The injection molding machine set forth in claim 2, wherein
a first pair of bushing elements having a first spacing and being mounted on flat grinded clamping surfaces of said bushing support and being adapted to be replaced by a further pair of bushing elements adapted to be mounted on said bushing support and having a second spacing differing from said first spacing.

7. The injection molding machine set forth in claim 6, wherein
bushing elements of said second pair differ in inside diameter from bushing elements of said first pair.

8. The injection molding machine set forth in claim 1, wherein
when shifting first rods disposed into injection direction and bearing said injection molding unit slide on second rods transversely disposed with respect to said injection axis, which are supported on finish-machined bearings at a machine base.

9. The injection molding machine set forth in claim 8, wherein
said second rods are cross bars, said bearings are formed at a flanged longitudinal edge of side walls of said machine base, a buttress block placed under said longitudinal edge is welded on from above by slots and abuts a screw centered at said buttress block for said cross bars, said screw being formed as an adjusting screw.

10. The injection molding machine set forth in claim 8, wherein
said first rods are a pair of rods constituting a slide together with two cross webs, whereby said slide bears supporting members on its front side for said drive unit.

11. The injection molding machine set forth in claim 10, wherein
said supporting members are constituted by two identical casting bodies, disposed mirror symmetrically with respect to a vertical plane extending through said injection axis and said supporting members being formed as radially splitted tensioning bushings in the area of said end sections of said drive unit, said tensioning bushings being clampable with said end sections by said pulling bolts which intersperce gaps of said splitted tensioning bushings.

12. The injection molding machine set forth in claim 8, wherein
said second rods are formed as cross bars and are interconnected by a supporting rod provided with a rest opening in which said injection molding unit is lockable.

13. The injection molding machine set forth in claim 12, wherein
said support rod disposed in a plane of symmetry of said injection molding unit receives a rest element in said rest opening of said injection molding unit when returned and wherein said injection molding unit is horizontally pivotable, whereby said piston rods of said drive cylinders, which are detached from said bushings after resting has been effected, are withdrawable.

* * * * *